United States Patent [19]

McCullough, Jr. et al.

[11] Patent Number: 5,194,529

[45] Date of Patent: Mar. 16, 1993

[54] POLYMERIZATION PROCESS

[75] Inventors: James D. McCullough, Jr.; Israel G. Burstain, both of Houston, Tex.

[73] Assignee: Shell Oil Company, Houston, Tex.

[21] Appl. No.: 783,733

[22] Filed: Oct. 28, 1991

[51] Int. Cl.$^5$ .............................................. C08F 2/00
[52] U.S. Cl. ....................................................... 526/78
[58] Field of Search ............................................ 526/78

[56] References Cited

U.S. PATENT DOCUMENTS 4,851,488 7/1989 Burstain ................................. 526/78

*Primary Examiner*—Joseph L. Schofer
*Assistant Examiner*—David Wu

[57] ABSTRACT

An improved process for making changes in polymer product type in an ongoing olefin polymerization process without undue disruption of the ongoing polymerization process comprises adding to the polymerization reactor a hydrogenation catalyst and sufficient molecular hydrogen to hydrogenate the unreacted olefin monomer, subsequently removing hydrogenated product and hydrogenation catalyst while resuming polymerization to produce polymer product of changed type upon addition to the reactor of olefin feed appropriate for production of such polymer product of changed type.

5 Claims, No Drawings

POLYMERIZATION PROCESS

FIELD OF THE INVENTION

This invention relates to the polymerization of olefinic compounds. More particularly, the invention relates to an improved ongoing process for polymerization of lower α-olefins wherein it is desired to change from one product type to another without the need for "shut-down" of the polymerization reactor.

BACKGROUND OF THE INVENTION

The polymerization of olefinic compounds and particularly lower α-olefins such as ethylene and propylene has gained substantial commercial acceptance. The polymer products thereby produced are relatively inexpensive and demonstrate commercially attractive properties. Numerous patents and literature references describe such polymerization processes and the practice of olefin polymerization on a commercial basis is widespread.

In the practice of olefin polymerization, reaction takes place under polymerization conditions that are now largely conventional and in the presence of an olefin polymerization catalyst. A variety of olefin polymerization catalysts have been employed with most being based on a transition metal. Recent polymerization catalysts are generally based on titanium and many if not most additionally contain moieties of magnesium and halogen. A number of polymerization processes incorporate molecular hydrogen in the reactor which serves to control the molecular weight of the polymer product as well as the product properties which correlate with molecular weight.

During commercial olefin polymerization it is beneficial to operate the polymerization process in an ongoing or minimally interrupted manner in order to minimize the down time of the polymerization line. Yet, most polymerization lines are designed to and in fact do produce product of differing types, whether because of differing chemical composition, differing properties or differing molecular weight. A change of reactant feed or reaction conditions is often difficult to accomplish without undesirable economic effects. The change from one monomer feed to another in an ongoing process typically results in the production of considerable "off-spec" polymer as, for example, a portion of the first monomer is found in the product produced from the newly introduced monomer feed, particularly if the first monomer is relatively inactive as compared with the monomers of the new feed. Such mixed or intermediate material is undesirable and must often be disposed of to the economic detriment of the process.

Whenever a change of product type is desired through feed changes or even when mechanical changes are necessary it is customary to temporarily retard or even stop polymerization so that the change can be made without the production of so much undesirable product. However, once the change has been made it is highly beneficial to resume polymerization as soon as possible to minimize down-time. One method of halting polymerization is through polymerization catalyst kill as by introducing to the polymerization reactor a catalyst poison such as carbon monoxide or certain esters, e.g., ethyl p-ethoxybenzoate. This procedure, although commercially employed, is limited to certain catalysts and has substantial detriment because the catalyst poison must be substantially completely removed from the polymerization reactor before resumption of the polymerization process. This removal is costly in terms of time and material. The effect of certain catalyst poisons can be overcome by the addition of an excess of the organoaluminum compound normally employed as the polymerization cocatalyst, but the provision of this excess is also expensive and leads to higher metallic residues in the product. It is also known that production of off-spec material through polymerization termination is accomplished by venting unreacted monomer and any other gaseous polymerization mixture components from the reactor. This venting of substantial quantities of unreacted monomer has an undesirable economic effect and also poses an environmental problem.

It is known that some few changes can be made in polymer product type without complete termination of polymerization. Burstain, U.S. Pat. No. 4,851,488, discloses a method for reducing the melt flow of a polypropylene polymer produced in an ongoing process by adding a hydrogenation catalyst to the polymerization reactor and hydrogenating a portion of the olefin monomer present. This serves to effectively lower the molecular hydrogen concentration within the polymerization reactor and, as a result, the melt flow of the polypropylene polymer thereby produced. The polymerization process is not completely terminated by this process although the hydrogenation catalyst must be removed or inactivated before normal polymerization can resume. Moreover, this particular process change is limited to reduction of melt flow or related properties. It would be of advantage to provide an improved method of temporarily terminating polymerization during an ongoing polymerization process to provide for mechanical, chemical or physical changes to the process and/or product types. Such method should permit rapid resumption of polymerization to polymer product of acceptable properties if uneconomical delays in process operation are to be avoided.

SUMMARY OF THE INVENTION

The process of the invention provides an improved process for polymerization of lower α-olefins. More particularly, the invention provides an improved ongoing process for polymerization of α-olefins, particularly propylene, in which changes in product type are accomplished without the necessity of substantial process disruptions. The process of the invention provides for changes in polymer product type without reactor shut-down or loss of polymerization catalyst activity.

DESCRIPTION OF THE INVENTION

The process of the invention comprises the addition to a lower α-olefin polymerization system of molecular hydrogen and a hydrogenation catalyst at the time a chemical or physical change in an ongoing olefin polymerization process is desired. This addition serves to hydrogenate the unreacted olefin monomer present in the polymerization without unduly adversely affecting the activity of the polymerization catalyst. The hydrogenation and the subsequent removal or inactivation of the hydrogenation catalyst is relatively rapid and resumption of polymerization is then observed upon provision of fresh monomer feed to the polymerization reactor.

The process of the invention is broadly applicable to a variety of lower α-olefin polymerizations producing homopolymeric or copolymeric product. In a preferred embodiment, however, the process is applied to the polymerization of propylene when changes in polymer properties are desired. The polypropylene production is preferably achieved by one of the more recent olefin polymerization processes employing a high activity, stereoregular polymerization catalyst. In terms conventionally used to describe such catalysts, the stereoregular catalysts of high activity contain a procatalyst which is usually a titanium-containing solid and often a magnesium halide, and customarily additionally contains an electron donor. Suitable electron donors incorporated in such procatalysts include ethers, esters, nitriles, phosphines, phosphites, steibines, arsines, phosphoramides, alcoholates and silanes which are employed singly or in combination. The preferred electron donors are esters, particularly alkyl esters of aromatic monocarboxylic or dicarboxylic acids, e.g., ethyl benzoate or diisobutyl phthalate.

The second component of the polymerization catalyst is an organoaluminum compound, conventionally termed a cocatalyst, which is often a trialkylaluminum compound such as triethylaluminum or tributylaluminum, or alternatively is an alkylaluminum halide such as diethylaluminum chloride, ethylaluminum dichloride or diisopropylaluminum chloride. In yet another modification, the organoaluminum compound is an alkylaluminum alkoxide. Organoaluminum compound such as diethylaluminum compounds are preferred as cocatalysts and particularly preferred is triethylaluminum. The cocatalyst is provided on occasion as a partial or total complex with the third catalyst component which is conventionally termed a selectivity control agent. The useful selectivity control agents are those conventionally employed with titanium-based procatalysts and organoaluminum cocatalysts. They are illustrated by esters, particularly alkyl esters of aromatic acids, amines, particularly hindered amines, phosphates, phosphites, silanes including alkylalkoxysilanes and arylalkoxysilanes, hindered phenols and mixtures thereof. The preferred selectivity control agents are alkyl esters of aromatic monocarboxylic and dicarboxylic acids, e.g., ethyl p-ethylbenzoate, ethyl p-methylbenzoate or diisobutyl phthalate, or are alkoxysilanes such as diisobutyldimethoxysilane, n-propyltrimethoxysilane or diphenyldimethoxysilane.

These high activity stereoregular olefin polymerization catalysts are described in numerous patents and other references including Nestlerode et al, U.S. Pat. No. 4,728,705. Although a variety of compounds are useful as constituents of the polymerization catalysts, a preferred catalyst contains a solid procatalyst containing a magnesium halide, a titanium tetrahalide and an electron donor which is as described above. The halide moieties of such procatalysts are typically chloride. The cocatalyst is a trialkylaluminum, particularly triethylaluminum, and the selectivity control agent is as described above. Use of this type of catalyst is well known in the art and when employed to catalyze the polymerization of α-olefin of 3 or more carbon atoms results in the efficient production of polymer which is predominantly stereoregular. In the polymerization of propylene, most polymer products are predominantly isotactic. Many of the catalysts are sufficiently active to cause the production of polymer product of acceptable properties without the necessity of removing catalyst residues from the polymeric product as by a deashing step.

The polymerization catalysts are illustratively formed by reacting a magnesium compound such as magnesium ethoxide with a tetratitanium halide such as titanium tetrachloride, in the presence of the electron donor and, optionally, in the presence of a halohydrocarbon. The resulting solid is optionally washed with additional tetravalent titanium halide and is then washed with light hydrocarbon to remove unreacted titanium compounds. The resulting solid procatalyst is contacted with the cocatalyst and selectivity control agent before or after introduction to the polymerization reactor.

The catalysts are used in well known types of olefin polymerization processes to produce lower α-olefin polymers. The process is suitably a gas-phase process utilizing one or more beds of fluidized polymer in the substantial absence of reaction diluent or is a liquid phase, also called a slurry-phase, process in the presence of a liquid reaction diluent such as propane or octane or a liquified monomer of the polymerization process such as liquid propylene. The polymerization process is suitably batchwise or is operated in a continuous or semi-continuous manner. To obtain the advantages of the present invention, a continuous or semi-continuous process is preferred as is a gas-phase process. The polymerization is effected by contacting the α-olefin monomer and the polymerization catalyst under polymerization conditions. Typical polymerization conditions include a polymerization temperature of from about 30° C. to about 120° C., preferably from about 40° C. to about 90° C. The polymerization pressure is suitably from about 2 atmospheres to about 35 atmospheres depending in part on whether the polymerization process is gas-phase or slurry phase. Liquid phase pressures are typically from about 10 atmospheres to about 25 atmospheres where gas phase pressures are from about 20 atmospheres to about 35 atmospheres. The precise methods of conducting the polymerization process and the selection and control of polymerization conditions are within the knowledge and skill of the art. The polymer product passes from the polymerization zone (polymerization reactor) to a separation zone wherein polymer product is separated from unreacted monomer and other reaction mixture components which are customarily returned to the polymerization reactor.

It is useful on some occasions to produce a homopolymeric product as by charging to the reactor an olefin feed containing a single lower α-olefin, i.e., a single olefin of up to 4 carbon atoms inclusive. Alternatively, the process of the invention is applied to the production of polymer as by providing an olefin feed containing 2 or even more olefins and recovering product containing moieties of each of the lower α-olefins provided to the reactor. In the preferred embodiment of the invention, propylene with up to a small proportion, e.g., up to about 6% by weight, of other α-olefin is polymerized to form polypropylene. The product obtained when a small proportion of other α-olefin is fed to the polymerization reactor is technically a copolymer but is conventionally included within the meaning of the term polypropylene. Particularly preferred is the embodiment where the process of the invention is applied to an on-going process of producing polypropylene homopolymer from an olefin feed containing substantially only propylene. In any of these embodiments, it is known to optionally include minor proportions of molecular hydrogen to control the molecular weight of the polymer product.

The process of the invention is applied to such olefin polymerization processes whenever it is desired to change the polymer product type without unduly interrupting the ongoing polymerization process. Instances of such a change in the nature of the polymer product include a change from copolymer production to homopolymer production or when a change from a first homopolymer or copolymer to a second homopolymer or copolymer of different physical properties. The process of the invention comprises the addition to the polymerization system of molecular hydrogen and a hydrogenation catalyst under hydrogenation conditions to hydrogenate at least a major proportion of unreacted olefin monomer in the polymerization system. This hydrogenation, optionally employed with venting of a small proportion of unreacted monomer, serves to terminate polymerization through "reactor starvation", i.e., the effective removal of olefinic reactant from the polymerization system, without adversely affecting the activity of the polymerization catalyst. The present process contrasts with other polymerization termination techniques which employ carbon monoxide or other catalyst poisons to "kill" the polymerization catalyst. In the process of the invention, polymerization is resumed upon the provision of fresh α-olefin feed to the reactor without the need for catalyst replacement.

The hydrogenation catalyst utilized in the process of the invention is a broadly conventional hydrogenation catalyst used to hydrogenate olefinically unsaturated compounds to the corresponding saturated compound. Suitable hydrogenation catalysts include transition metal catalysts, particularly those catalysts wherein the transition metal is nickel, cobalt, palladium, platinum, rhodium or ruthenium. The catalyst is employed as a supported catalyst containing catalyst support materials such as graphite or alumina or as an unsupported catalyst containing the transition metal combined with or complexed with a variety of stabilizing anions or ligands. Supported catalysts are illustrated by nickel or palladium or graphite and unsupported catalysts are illustrated by nickel octanoate, cobalt carbonyl, nickelocene, tetrakis (triphenylphosphine)nickel, bis(1,5-cyclooctadiene)nickel, bis(triphenylphosphine)platinum(II) chloride, dihydridotetrakis(triphenylphosphine)ruthenium(II) and chloro(norbornadiene)rhodium(I) dimer. Other suitable hydrogenation catalysts are described in U.S. Pat. No. 4,851,488, incorporated herein by reference.

The preferred hydrogenation catalysts are titanium catalysts, for example, biscyclopentadienyl titanium chloride, in part because the titanium catalysts are not adversely affected by the trialkylaluminum cocatalyst and ester or silane selectivity control agents often present in the polymerization reactor and are already present in the system from the polymerization catalyst. The hydrogenation catalyst is introduced to the polymerization reactor in a catalytically effective quantity sufficient to catalyze the hydrogenation of unreacted olefin monomer when a change in polymer product type is desired during an ongoing α-olefin polymerization. The precise quantity of hydrogenation catalyst will depend in part upon the size of the polymerization reactor and the amount of unreacted olefin monomer present. Customary quantities of hydrogenation catalyst are from about 0.01 part per million to about 3000 parts per million by weight based on the total weight of materials present in the polymerization reactor. Quantities of hydrogenation catalyst from about 1 part per million to about 100 parts per million on the same basis are preferred. In the embodiment utilizing the preferred titanium catalysts, quantities of hydrogenation catalyst from about 5 parts per million to about 15 parts per million on the same basis are particularly useful.

The molecular hydrogen added to the polymerization reactor to hydrogenate unreacted olefin monomer in the presence of the hydrogenation catalyst is sufficient to hydrogenate at least the major proportion of the unreacted olefin monomer. The precise quantity of molecular hydrogen will vary with the quantity of unreacted olefin monomer and, of course, some molecular hydrogen may be already present as that hydrogen utilized during polymerization for molecular weight control. In any event, to accomplish the objectives of the present invention it is necessary to add molecular hydrogen to have present sufficient molecular hydrogen to hydrogenate at least a major proportion of unreacted olefin monomer present. The provision of too little hydrogen is not entirely detrimental to the operation of the process of the invention as the amount of off-spec polymer product obtained during a change of product type will still be reduced. It is also possible to vent any olefin monomer that has not been hydrogenated and the proportion of vented monomer will be significantly reduced by the operation of the present process. In either instance, the process of the invention provides economic benefit. However, desirable results are obtained if sufficient molecular hydrogen is provided to hydrogenate at least about 75% of the unreacted olefin monomer and preferred quantities of hydrogen are those quantities sufficient to hydrogenate more than about 99% of the unreacted olefin monomer.

In the practice of the process of the present invention, molecular hydrogen and the hydrogenation catalyst are added to the polymerization reactor and the reactor and contents are maintained under hydrogenation conditions of temperature and pressure to cause the hydrogenation of unreacted olefin monomer. Such conditions will vary somewhat with the nature of the olefin monomer undergoing hydrogenation and the particular hydrogenation catalyst employed. However, the hydrogenation conditions of temperature and pressure are typically within the conditions employed for polymerization so that substantial overall changes in the reactor conditions are not required for olefin hydrogenation.

Subsequent to the hydrogenation of olefin monomer, the reactor will contain substantial quantities of saturated hydrocarbon corresponding to the olefin monomer and also hydrogenation catalyst. Both of these materials should be removed to permit optimum resumption of olefin polymerization. The saturated hydrocarbon poses no large problem as it will join the diluent, in the case of a slurry-phase process, and/or will be separated from the other materials present during the normal separation and purification portions of the polymerization scheme. The hydrogenation catalyst will also be removed from the reactor during the normal passage of materials through the reactor and is removed in no more than a few polymerization reactor residence times. Upon completion of the hydrogenation and removal/deactivation of the hydrogenation catalyst, the ongoing polymerization process is resumed through addition of the feed required for production of polymer product of changed type with only minimal disruption of the ongoing process.

The invention is further illustrated by the following Illustrative Embodiment which should not be regarded as limiting.

ILLUSTRATIVE EMBODIMENT

An ongoing propylene polymerization process is conducted by introducing propylene into a reactor which contains a slurry of polymerization catalyst in liquid propane. The catalyst is formed from a solid titanium-based procatalyst, a triethylaluminum cocatalyst and an ethyl p-ethylbenzoate selectivity control agent. The process is operated by continuously adding propylene, 1-butene, propane, molecular hydrogen for molecular weight control, and the catalyst components to the reactor and removing polymer and unreacted polymerization mixture components from the reactor. The product is separated from the withdrawn mixture and recovered while the other mixture components are removed from the polymerization system or are recycled.

If it is desired to change the product of the polymerization process to a homopolymer of propylene molecular hydrogen and bis(cyclooctadienyl) titanium is added to the reactor while the flow of 1-butene is halted and that of propylene and polymerization catalyst is temporarily halted. The unreacted propylene and 1-butene monomers in the reactor are hydrogenated to propane and butane by the hydrogen added. Removal and replacement of the non-gaseous reactor components will serve to remove the hydrogenation catalyst. Addition of propylene is resumed along with the introduction of catalyst. Polymerization resumes at a good rate to produce propylene homopolymer.

What is claimed is:

1. In the process of making a change of polymer product type in an ongoing lower α-olefin polymerization process wherein olefin feed, olefin polymerization catalyst and optionally molecular hydrogen are introduced to a polymerization reactor and maintained under polymerization conditions, thereby producing a polymerization product mixture including polymer product, and the polymerization mixture is removed from the reactor and separated to polymer product and other polymerization mixture components which are recycled, the improvement of adding hydrogenation catalyst and molecular hydrogen to the reactor to provide sufficient hydrogen to hydrogenate the major proportion of the unreacted olefin present in the presence of the hydrogenation catalyst, thereby terminating the polymerization process, terminating the activity of the hydrogenation catalyst and producing polymer of changed type upon provision to the reactor of olefin feed appropriate for production of polymer product of changed type.

2. The process of claim 1 wherein the hydrogenation catalyst is a transition metal catalyst wherein the transition metal is titanium, nickel, cobalt, palladium, platinum, rhodium or ruthenium.

3. The process of claim 2 wherein the transition metal is titanium.

4. The process of claim 3 wherein the α-olefin is propylene.

5. The process of claim 4 wherein the titanium catalyst is biscyclopentadienyl titanium chloride.

* * * * *